J. W. CLIFTON.
SPRING WHEEL.
APPLICATION FILED MAY 3, 1913.
1,101,405.
Patented June 23, 1914.
2 SHEETS—SHEET 1.
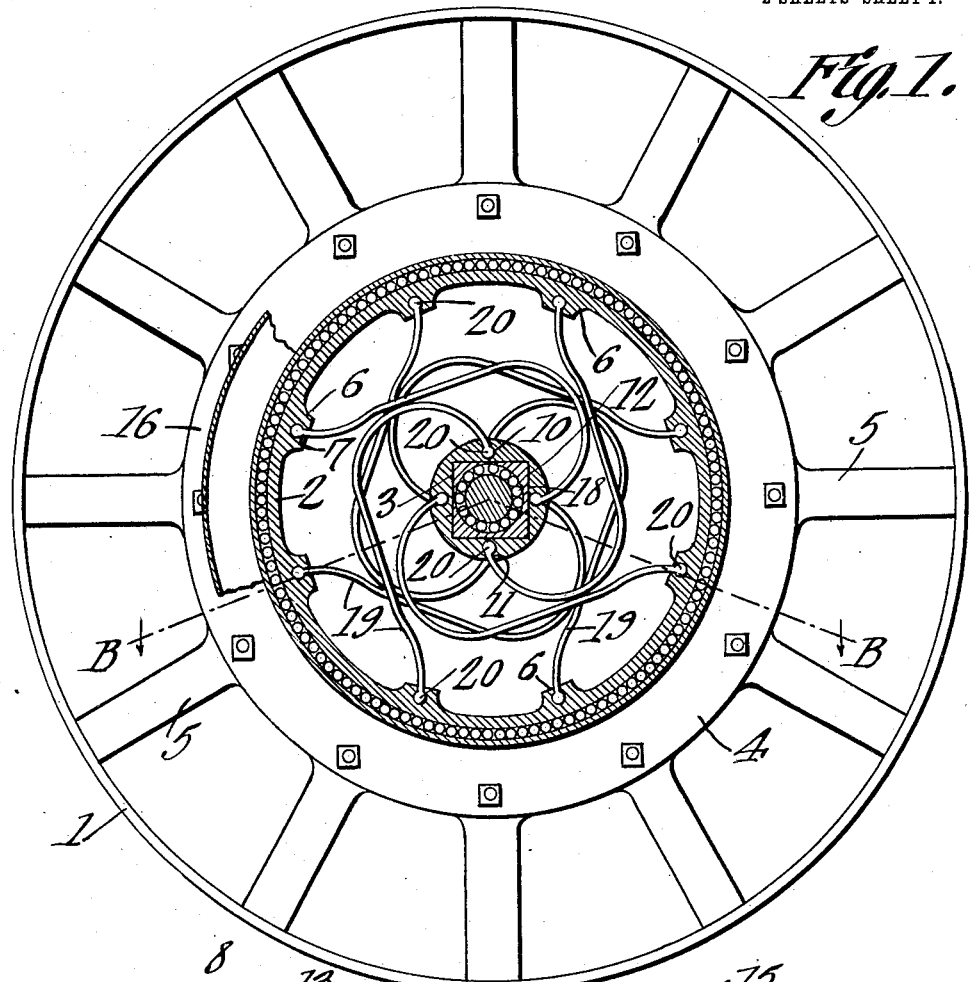
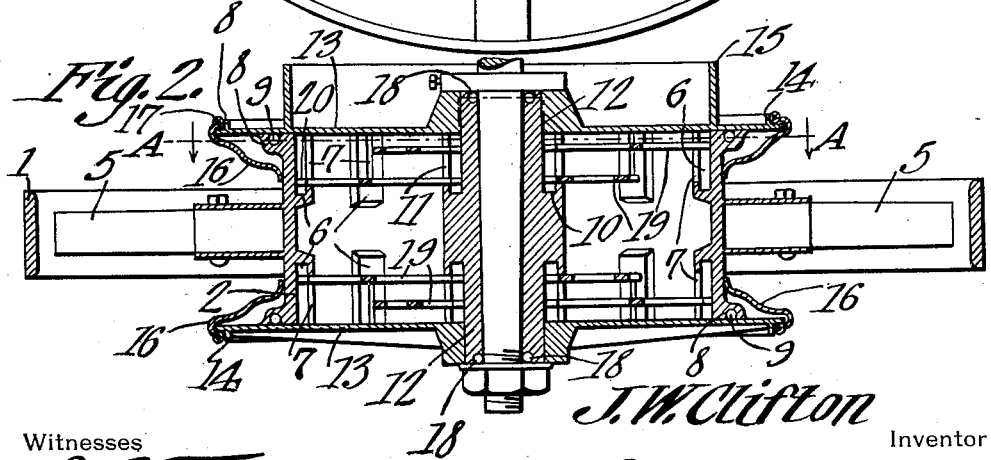
Witnesses
J. W. Clifton
Inventor
by
Attorneys J. W. CLIFTON.
SPRING WHEEL.
APPLICATION FILED MAY 3, 1913.
1,101,405.
Patented June 23, 1914.
2 SHEETS—SHEET 2.
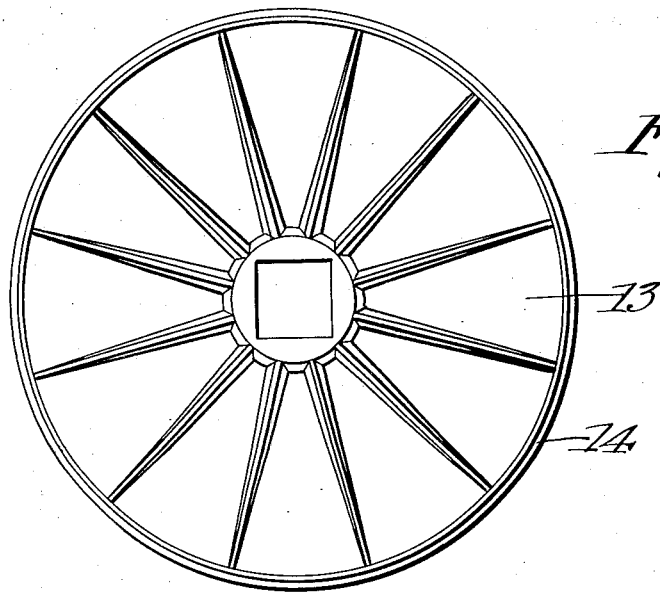
Fig. 3.
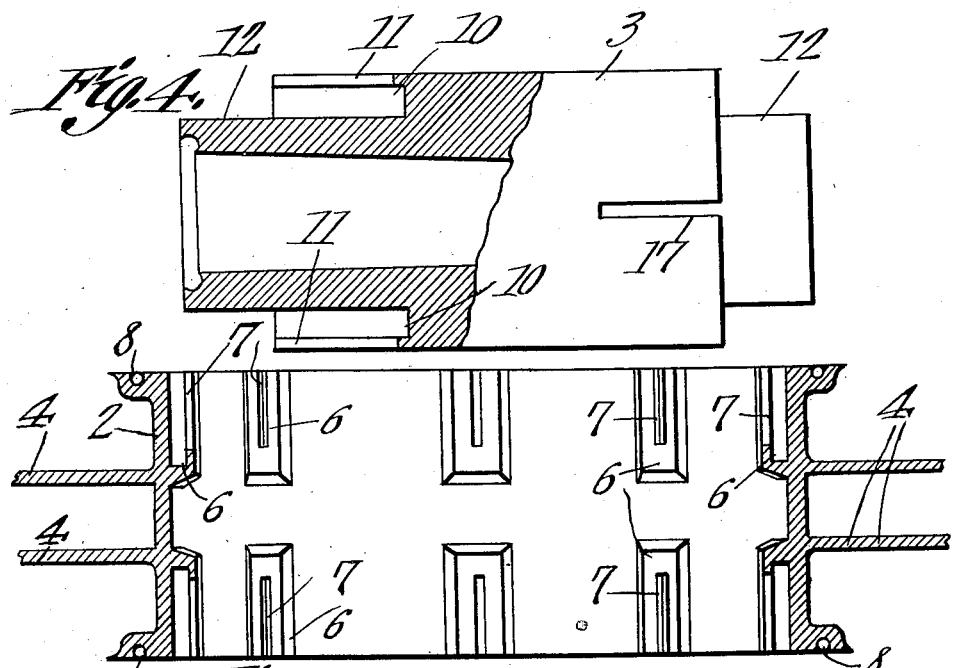
Fig. 4.
Fig. 5.
Witnesses
J. W. Clifton
Inventor
by C. A. Snow & Co.
Attorneys

UNITED STATES PATENT OFFICE.

JAMES W. CLIFTON, OF MACON, GEORGIA.

SPRING-WHEEL.

1,101,405.  Specification of Letters Patent.  Patented June 23, 1914.

Application filed May 3, 1913. Serial No. 765,368.

*To all whom it may concern:*

Be it known that I, JAMES W. CLIFTON, a citizen of the United States, residing at Macon, in the county of Bibb and State of Georgia, have invented a new and useful Spring-Wheel, of which the following is a specification.

My invention relates to new and useful improvements in spring wheels.

The primary object of the invention is the provision of a substantial wheel which is resilient and will overcome excessive jarring.

A further object of the invention is the provision of a wheel of this character in which the spring spokes may be easily removed and replaced.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings: Figure 1 is a sectional view on the line A—A of Fig. 2 with parts broken away. Fig. 2 is a sectional view on the line B—B of Fig. 1. Fig. 3 is a side elevation of the side plate. Fig. 4 is a view of the hub partly in section. Fig. 5 is a sectional view of the intermediate rim.

In the drawings the numeral 1 indicates the rim; 2, an intermediate rim and 3, a hub. Flanges 4 are formed integral with the intermediate rim and receive the rigid spokes 5 which are between the outer rim and the intermediate rim. On the inner periphery of the intermediate rim are formed the socket members 6 having the slots 7 and as clearly shown these socket members are formed on each side of the rim. Ball races 8 are formed on the side faces of the intermediate rim as clearly shown in Fig. 5 and in these ball races are received the balls 9.

Sockets 10 are formed in each end of the outer periphery of the hub, said sockets being provided with the slots 11 as clearly shown in Fig. 4 of the drawings. The ends of the hub are squared at 12 and plates 13 are mounted on the squared ends of the hub. These plates are of greater diameter than the intermediate rim. The plates are provided with the flanges 14 and may also be provided with the flanges 15 to receive a brake band. A flexible strip, preferably of rubber, 16 having a wire band 17 secured thereto is secured to each plate 13 and as will be seen engages the plate and the flanges 14. This flexible strip also engages the intermediate rim as shown in Fig. 2 of the drawings and prevents the accumulation of dust or other substance on the interior of the wheel. The ends of the hub are provided with the usual ball bearings 18 which prevent friction.

Between the intermediate rim and the hub I provide the spring spokes 19 which are of the shape shown in Fig. 1 of the drawings. The spokes are enlarged at the ends as shown at 20 and these enlarged ends of the spokes are received in the socket members formed on the intermediate rim and in the hub. The spokes pass through the slots formed in the socket members and as shown in Fig. 2 of the drawings there are four rows of these spring spokes, there being two rows on each end. There are twice the number of socket members formed on the intermediate rim as there are formed in the hub which will necessitate the ends of two spring spokes being received in each socket of the hub. The socket members of the intermediate rim only receive the end of one spoke. By having the spring spokes of the shape shown one end of the spoke is held in a socket on one side of the hub and the opposite end of the spoke is received in a socket on the intermediate rim at a point opposite the opposite side of the hub. The spring spokes overlap in the manner indicated in Fig. 1 and will take the strain from the wheel in any direction.

The plates 13 close the ends of the socket members to prevent the accidental displacement of the spring spokes. As is clearly shown in Fig. 2 of the drawing the balls 9 engage on the inner face or surface of the plates 13 and thereby overcome any friction.

Having fully described my invention what I claim as new and desire to secure by Letters Patent is:—

A spring wheel comprising a rim, a hub and an intermediate rim, rigid spokes between the two rims, sockets formed on the inner periphery of the intermediate rim and the outer periphery of the hub, and spring spokes between the intermediate rim and hub, the ends of two spokes being received in each socket on the hub and the spokes extending in opposite directions around the hub and the ends received in circumferentially spaced sockets in the rim at a point on the opposite side of the hub.

In testimony that I claim the foregoing as my own, I have hereto affixed my signature in the presence of two witnesses.

JAMES W. CLIFTON.

Witnesses:
SELINA WILLSON,
JULIA S. STEVENS.

Copies of this patent may be obtained for five cents each, by addressing the "Commissioner of Patents. Washington, D. C."